United States Patent

Maucher

[15] 3,684,070
[45] Aug. 15, 1972

[54] CLUTCH DISC
[72] Inventor: Paul Maucher, Im Finkengarten, 7571 Neuweier, Germany
[22] Filed: April 21, 1970
[21] Appl. No.: 30,483

[52] U.S. Cl.............192/106.2, 192/106, 192/107 CP, 64/27 F
[51] Int. Cl.................................................F16d 3/14
[58] Field of Search..........192/106.1, 106.2, 107 CP; 64/27 F

[56] References Cited

UNITED STATES PATENTS

| | | |
|---|---|---|
| 2,618,369 | 10/1952 | Zeidler................192/107 CP |
| 2,687,627 | 8/1954 | Binder....................192/106.2 |
| 3,266,271 | 8/1966 | Stromberg..............192/106.2 |

*Primary Examiner*—Benjamin W. Wyche
*Assistant Examiner*—Randall Heald
*Attorney*—Curt M. Avery, Arthur E. Wilfond, Herbert L. Lerner and Daniel J. Tick

[57] ABSTRACT

Clutch disc includes a hub, an entrainer plate coaxially mounted on and turnable relative to the hub, a pair of friction linings mounted coaxially to one another on the hub adjacent the entrainer plate, a cover disc coaxially mounted on the hub in spaced relationship to the entrainer plate which is turnable relative thereto, rivet means connecting the cover disc to the entrainer plate, a damping device disposed in a force transmission path between the pair of friction linings, on the one hand, and between the entrainer plate and the hub, on the other hand, the damping device comprising force storing means operatively connected to the hub and to the entrainer plate, damping lining means coaxially mounted on the hub, and a spring member in stressing engagement with the damping lining means for frictionally connecting the latter to the entrainer plate, the spring member being coaxially mounted on the hub between the relatively turnable entrainer plate and cover disc, the spring member having an annular surface engaging the damping lining means and having means engageable with a peripheral contour of the rivet means interconnecting the entrainer disc and the cover disc for securing the spring member, at a location radially beyond the damping lining means, against turning.

5 Claims, 3 Drawing Figures

CLUTCH DISC

My invention relates to clutch disc and, more specifically to such clutch disc having a damping device comprising force storing means located in the force transmission path between friction linings and between an entrainer plate connected by rivets to a cover disc and a hub of the clutch disc, the force storing means being in operative connection with the hub and with the entrainer plate coaxial thereto and turnable thereabout as well as with damping linings that are in frictional engagement with the entrainer plate and with the cover disc and are subjected to the force of a spring member annularly abutting one of the damping linings and secured radially beyond the damping linings against turning thereof. With such a clutch disc such as has become known by the British Pat. No. 909,914 it has been taught that a uniform bearing pressure over the wearing path of damping linings of the clutch disc is attainable by a spring member which has a radial expansion extending beyond that of the damping linings. In this known clutch disc, on the outer side of the carrier or entrainer plate and of the cover disc, a dish-like spring member is firmly riveted, by radially outwardly extending arms thereof, with spacer rivets.

In such known clutch discs, however, both the transverse as well as the longitudinal stability of the clutch disc are not ensured because the centering guidance of the disc parts relatively turnable about the hub no longer results from the entrainer plate and the cover disc but rather is effected either by only the one cover disc and the unstable spring member or, however, in another embodiment, solely by two unstable spring members that are riveted to the outer sides of the carrier or entrainer plate and the cover disc. Such a clutch disc is thus exceptionally unstable and especially during axial displacement on the keyed shaft and during the assembly process is extremely sensitive and susceptible to trouble. Moreover, due to the riveting of the spring member on the outer side of the clutch disc, the characteristic curve of such a spring element is distorted so that an optimal uniform prestress over the path of wear of the damping linings is unstable.

It is accordingly an object of my invention to provide a clutch disc which avoids the aforementioned disadvantages of the heretofore known clutch disc of this general type and to provide a novel clutch disc wherein the damping effect over the entire life span of the clutch and over the path of wear of the damping linings exhibits an optimal constant value without suffering a loss in the stability thereof. Further objects of my invention is to provide such a clutch disc which requires a markedly low headroom, which is relatively simple to assemble and which can be produced economically.

With the foregoing and other objects in view I provide in accordance with my invention clutch disc comprising a hub, an entrainer plate coaxially mounted on and turnable relative to the hub, a pair of friction linings mounted coaxially to one another on the hub adjacent the entrainer plate, a cover disc coaxially mounted on the hub in spaced relationship to the entrainer plate which is turnable relative thereto, rivet means connecting the cover disc to the entrainer plate, a damping device disposed in a force transmission path between the pair of friction linings, on the one hand, and between the entrainer plate and the hub, on the other hand, the damping device comprising force storing means operatively connected to the hub and to the entrainer plate, damping lining means coaxially mounted on the hub, and a spring member in stressing engagement with the damping lining means for frictionally connecting the latter to the entrainer plate, the spring member being coaxially mounted on the hub between the relatively turnable entrainer plate and cover disc, the spring member having an annular surface engaging the damping lining means and having means engageable with a peripheral contour of the rivet means interconnecting the entrainer disc and the cover disc for securing the spring member, at a location radially beyond the damping lining means, against turning.

In accordance with a further feature of the invention the spring member means that are engageable with the peripheral contour of the rivet means comprise radially extending arms of which at least one at least partly engages the rivet means.

By such construction and arrangement of the spring member, which only loosely abuts the rivet means at the peripheral surface thereof and is no longer firmly riveted to either the entrainer plate or the cover disc this spring member can automatically adjust to increasing wear of the damping linings, and a distortion of the characteristic curve of the spring due to riveting does not occur.

The arms extending from the spring member and at least partly engaging the rivet means, in accordance with a further feature of the invention, abut either the outer diametrical region of the cover disc or the entrainer plate.

In accordance with other features of the invention, the prestressing of the spring member is effected by standing away or being bent toward one direction and/or the spring member is prestressed by a collar located at the rivet means. In accordance with an additional feature of the invention, the clutch disc is provided with a spring element having a prestressing and accordingly a characteristic curve which is substantially of the same value over the entire path of wear of the damping linings.

Other features which are considered as characteristic for the invention are set forth in the appended claims.

Although the invention is illustrated and described herein as embodied in clutch disc, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
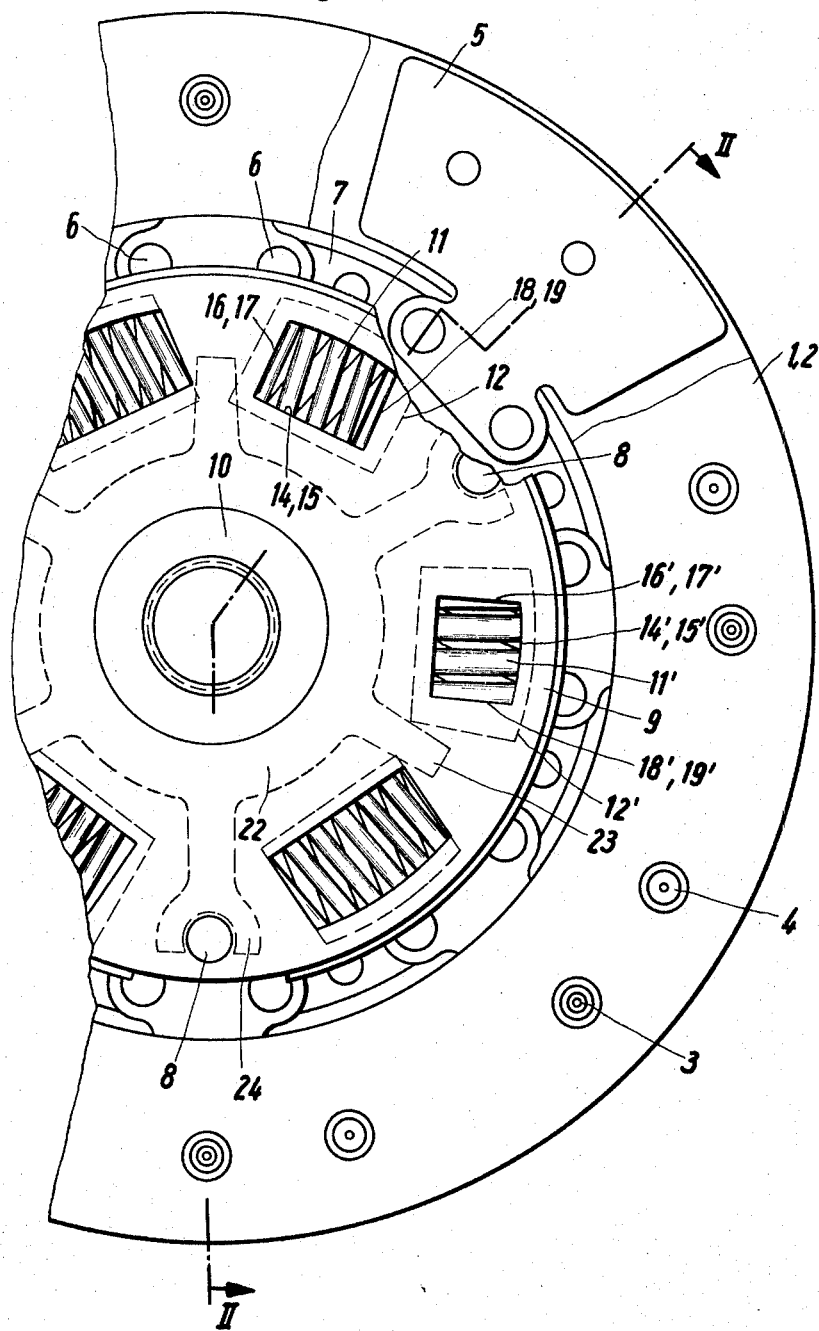
FIG. 1 is a plan view partly broken away, of a clutch disc constructed in accordance with my invention.
Figure 2:
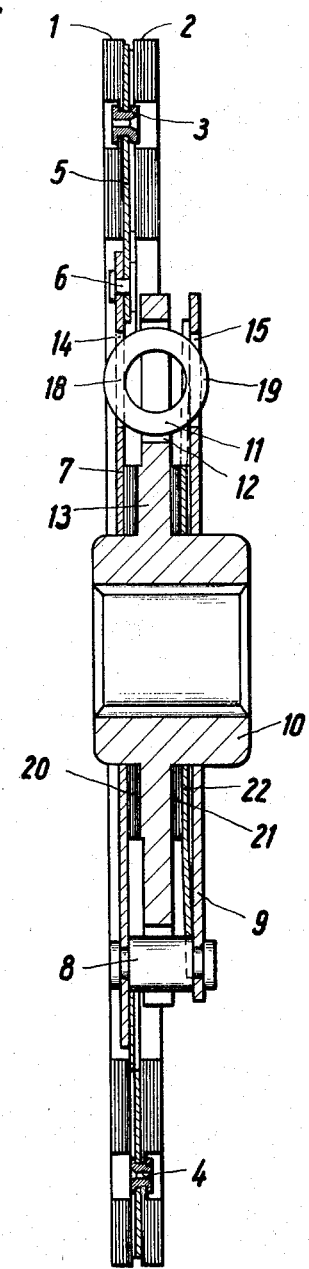
FIG. 2 is a sectional view of FIG. 1 taken along the lines II—II in the direction of the arrows.

Referring now to the drawings and first particularly to FIGS. 1 and 2 thereof, there is shown a clutch disc according to my invention having a pair of friction linings 1 and 2 which are riveted in a conventional manner by rivets 3 and 4 to resilient segments 5. For further information regarding such construction reference can be had to the copending application Ser. No. 30,482, filed Apr. 21, 1970, of which I am coinventor. The segments 5 are in turn connected by rivets 6 to an entrainer plate 7 which is in turn riveted to a cover disc 9 by spacer rivets 8. The entrainer plate 7 and the cover disc 9 are coaxially mounted so that they are fixed in radial direction on a hub 10 but are relatively turnable about the hub 10.

A damping device is provided in the force transmission path between the friction linings 1 and 2, on the one hand, and between the entrainer plate 7 and the cover disc 9 connected therewith by the spacer rivets 8 as well as the hub 10, on the other hand. The damping device is formed of compression springs 11 and 11' which are received in window-shaped recesses 12 and 12' formed peripherally in a flange 13 extending from the hub 10. The compression springs 11 and 11' are held laterally by window-shaped recesses 14, 14' and 15, 15' formed respectively in the entrainer plate 7 and the cover disc 9 and being respectively in registry with the window-shaped recesses 12 and 12'. The compression springs 11 and 11' cooperate with one of the substantially radially directed end contours 16, 17 and 16', 17' or 18, 19 and 18', 19', depending upon the direction of force transmission. The damping device also includes damping linings 20 and 21 which are disposed coaxially on the hub 10 and abut the hub flange 13, and of which one thereof is in frictional engagement with the diametrical inner region of the carrier or entrainer plate 7 and the other of which with the spring member 22. The spring member 22 is disposed in the space between the clutch components, namely the entrainer plate 7 and the cover disc 9, which are turnable relative to one another, and the radial arms 23 and 24 of the spring member 22 abut the outer diametrical region of the cover disc 2. The arm 24 loosely engages peripheral contours of the rivet 8 so as to protect against twisting or turning of the spring member 22. By this construction of the spring member 22, the stability of the clutch disc is not weakened and the spring member 22 can automatically adjust in accordance with the wear of the damping linings 20 and 21. In the foregoing embodiment, the spring member 22 is of substantially annular construction substantially over that diametrical region wherein the damping linings 20 and 21 extend, and the arms 23 and 24 extend radially upwardly over and beyond the region in which the damping linings 20 and 21 are located.

The prestressing of the spring member 22 is effected in a direction toward the damping lining 21 by having the spring element stand away or bend like a dish or plate spring in that direction.

Figure 3:
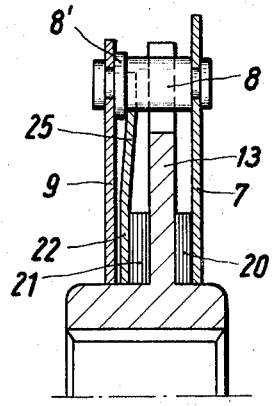
FIG. 3 is a partial sectional view corresponding to that of FIG. 2 showing a modified form of the clutch disc of my invention.

The prestressing of the spring member 22 can also be effected, however, for example in the manner shown in the embodiment of FIG. 3 wherein a single or several arms 25 extending from the spring element 22, which has a planar construction before assembly of the clutch disc, is forced to bend against a collar 8' formed at the rivet 8.

My invention is not limited to the hereinbefore described and illustrated embodiments. For example, the spring member which is located between the clutch components that are turnable relative to one another can have a different shape than the illustrated shapes, and the abutment of the spring member at the rivets to ensure against relative turning can be effected in another manner than that actually shown in the figures.

I claim:

1. Clutch disc comprising a hub, an entrainer plate coaxially mounted on and turnable relative to said hub, a pair of friction linings mounted coaxially to one another on said hub adjacent said entrainer plate, a cover disc coaxially mounted on said hub in spaced relationship to said entrainer plate which is turnable relative thereto, rivet means comprising a plurality of peripherally spaced rivets connecting said cover disc to said entrainer plate, a damping device disposed in a force transmission path between said pair of friction linings, on the one hand, and between said entrainer plate and said hub, on the other hand, said damping device comprising force storing means operatively connected to a flange of said hub and at least to said entrainer plate, damping lining means coaxially mounted on said hub, and a spring member in stressing engagement with said damping lining means for frictionally connecting the latter to said entrainer plate, said spring member being coaxially mounted on said hub between said relatively turnable entrainer plate and cover disc, said spring member having an annular surface portion engaging said damping lining means and having radially outwardly extending arms loosely and non-clampingly engageable with a peripheral contour of said rivets individually, and interconnecting said entrainer disc and said cover disc for securing said spring member, at a location radially beyond said damping lining means, against turning, while leaving said spring member, at least in the region thereof within said damping lining means, freely movable in axial direction thereof for applying a spring force in said axial direction.

2. Clutch disc according to claim 1, wherein said spring member and said arms thereof abut a collar respectively formed on said rivets.

3. Clutch disc according to claim 1, wherein part of said spring member stands away in a given direction from a given plane in which the remainder of said spring member is disposed.

4. Clutch disc according to claim 2, wherein said spring member is in prestressing engagement with said collars of said rivets.

5. Clutch disc according to claim 1, wherein said spring element is prestressed substantially uniformly over said path of wear of said damping linings.

* * * * *

PO-1050
(5/69)

UNITED STATES PATENT OFFICE
CERTIFICATE OF CORRECTION

Patent No. 3,684,070　　　　　　　　Dated August 15, 1972

Inventor(s) PAUL MAUCHER

It is certified that error appears in the above-identified patent and that said Letters Patent are hereby corrected as shown below:

In the heading to the printed specification there should be included:   --Foreign Application Priority Data, April 22, 1969 Germany.....G69 15 999.5-7301--   also   --Asignee:  LuK Lamellen und Kupplungsbau GmbH--.

Signed and sealed this 9th day of April 1974.

(SEAL)
Attest:

EDWARD M. FLETCHER, JR.　　　　　　C. MARSHALL DANN
Attesting Officer　　　　　　　　　　Commissioner of Patents